US012770342B2

(12) United States Patent
Choi et al.

(10) Patent No.: US 12,770,342 B2
(45) Date of Patent: Oct. 20, 2026

(54) SEMANTIC INFORMATION RETRIEVAL METHOD FOR AUGMENTED REALITY DOMAIN AND DEVICE THEREOF

(71) Applicants: Industry-Academia Cooperation Foundation of Sejong University, Seoul (KR); Research & Business Foundation SUNGKYUNKWAN UNIVERSITY, Gyeonggi-do (KR)

(72) Inventors: Soo-Mi Choi, Seoul (KR); Abolghasem Sadeghi-Niaraki, Seoul (KR); Tamer Is Abuhmed, Gyeonggi-do (KR)

(73) Assignees: Industry-Academia Cooperation Foundation of Sejong University, Seoul (KR); Research & Business Foundation SUNGKYUNKWAN UNIVERSITY, Gyeonggi-do (KR)

( * ) Notice: Subject to any disclaimer, the term of this patent is extended or adjusted under 35 U.S.C. 154(b) by 143 days.

(21) Appl. No.: 18/818,158

(22) Filed: Aug. 28, 2024

(65) Prior Publication Data

US 2025/0166317 A1 May 22, 2025

(30) Foreign Application Priority Data

Nov. 21, 2023 (KR) ........................ 10-2023-0162688

(51) Int. Cl.
*G06T 19/00* (2011.01)
*G06F 16/906* (2019.01)
*G06F 16/951* (2019.01)

(52) U.S. Cl.
CPC .......... *G06T 19/006* (2013.01); *G06F 16/906* (2019.01); *G06F 16/951* (2019.01)

(58) Field of Classification Search
CPC .... G06T 19/006; G06F 16/906; G06F 16/951
See application file for complete search history.

(56) References Cited

U.S. PATENT DOCUMENTS

2009/0037389 A1* 2/2009 Kothari ................. G06F 40/194
2013/0013580 A1* 1/2013 Geller ................... G06F 16/951 707/706
2019/0042563 A1* 2/2019 Pestian ................. G06F 40/253
2019/0318150 A1* 10/2019 Shamma ........... H04M 1/72427
2020/0342668 A1* 10/2020 Chojnacka ............. G06V 20/20
2023/0377283 A1* 11/2023 Engel ................... G02B 27/017

FOREIGN PATENT DOCUMENTS

KR 10-2178894 11/2020

* cited by examiner

*Primary Examiner* — Michelle Chin
(74) *Attorney, Agent, or Firm* — Christensen O'Connor Johnson Kindness PLLC

(57) ABSTRACT

A semantic information retrieval method for augmented reality domain and a device thereof are disclosed. The semantic information retrieval method for augmented reality domain may include performing semantic information retrieval in an AR (Augmented Reality) domain by using AR ontology consisting of AR concepts.

11 Claims, 8 Drawing Sheets

FIG. 8

```
Algorithm 1: Semantic information retrieval for AR search engine.
-----------------------------------------------------------------
     Input: q_u: User query
            C': list of main concepts
            Ont: AR ontology
   Output: result: Classified documents
DOC = getRDocuments(q_u)    #using the google API: googleapiclient
foreach doc ∈ DOC do
 |  link = getDocLink(doc)
 |  text = crawlDocPage(link) #
 |  words = preprocessing (text)
 |  matrix = generateMatrix (words, Ont, C')
 |  {w_n} = getSVSM (matrix)
 |   A = {w_n}
 |__ D.add(A)
result = kMeanClustering(D)
```

SEMANTIC INFORMATION RETRIEVAL METHOD FOR AUGMENTED REALITY DOMAIN AND DEVICE THEREOF

This application claims the priority benefit of Korean Patent Application No. 10-2023-0162688, filed on Nov. 21, 2023, in the Korean Intellectual Property Office, the disclosure of which is incorporated herein by reference.

BACKGROUND

1. Field of the Invention

The following description relates to a technology for approaching to information in augmented reality environment.

2. Description of Related Art

AR (Augmented Reality) combines digital information (such as texts, images, videos, and 3D models, etc.) with the real world, and as a future user interface, AR plays a significant role in supporting both consumers and industrial applications.

There are growing trends in R&D (research and development) of AR technology in various applications, e.g., learning, health, tourism, and manufacturing. For example, Korean Patent No. 10-2178894 (Registration date: Nov. 9, 2020) discloses a technology for providing education contents based on augmented reality by using images printed on a mat.

Recently, with emergence of the metaverse, popularity of AR is increasing, and accessing concise, accurate, and precise information in this field is becoming challenging on the WWW (world wide web).

In regard to accessing right information through search engines, semantic information retrieval via a semantic analysis delivers more relevant information pertaining to the user's query.

Although various methods for semantic information retrieval are being developed, there is insufficient research on semantic information retrieval methods in AR domain.

SUMMARY

An AR search engine based on a semantic information retrieval method in AR domain to perform effective information retrieval from web documents is provided.

An AR search engine that automatically organizes, understands, searches, and summarizes web documents to enhance relevancy scores in AR domain is provided.

An AR ontology for clustering AR documents into AR topics and concepts is provided.

An ontology-based clustering method using k-means clustering algorithm, vector space model, TF-IDF (term frequency-inverse document frequency) weighting model with ontology to explore and cluster AR documents is provided.

A semantic information retrieval method of a computer device comprising at least one processor comprises performing semantic information retrieval in an AR (Augmented Reality) domain by using AR ontology consisting of AR concepts, by the at least one processor.

According to one aspect, the AR ontology may comprise hardware, software, tracking, interaction, and interface related to AR According to another aspect, the performing may comprise categorizing web crawler results corresponding to search queries into AR fields through the AR ontology.

According to another aspect, the performing may comprise clustering AR documents into AR related topics or concepts by using the AR ontology.

According to another aspect, the performing may comprise representing AR documents as vectors according to concepts of the AR ontology; and clustering AR document vectors into the AR domain.

According to another aspect, the representing may represent the AR documents as N-dimensional vectors by using SVSM (Semantic Vector Space Model).

According to another aspect, the representing, as representing the AR documents as N-dimensional vectors by using SVSM (Semantic Vector Space Model), may comprise creating a two-dimensional (MXN) matrix comprising M concepts for each document; weighting each concept based on TF-IDF (term frequency-inverse document frequency) score representing relationship between concepts corresponding to each pair of the two-dimensional matrix; and creating SVSM for corresponding document by applying maximum weight for superclasses of seed concepts.

According to another aspect, the clustering may comprise displaying information retrieval results in clusters by clustering the AR document vectors by using k-means clustering.

According to another aspect, the performing may further comprise pre-processing to convert query and AR documents into a word sequence before the representing.

According to another aspect, the pre-processing may perform pre-processing through at least one of a process for performing tokenization breaking down query and AR documents into sentences and then individual words or terms, or a process for removing stop-words included in query and AR documents.

A non-transitory computer-readable recording medium storing program instructions to execute the semantic information retrieval method in the computer device is provided.

A computer device comprises at least one processor implemented to execute instructions readable in a computer device, and the at least one processor performs semantic information retrieval in an AR (Augmented Reality) domain by using AR ontology consisting of AR concepts.

According to embodiments of the present disclosure, by providing an AR search engine based on a semantic information retrieval method in AR domain to perform effective information retrieval from web documents, users may obtain more relevant results for search queries in different groups and obtain results very quickly in AR domain.

BRIEF DESCRIPTION OF THE DRAWINGS

These and/or other aspects, features, and advantages of the disclosure will become apparent and more readily appreciated from the following description of embodiments, taken in conjunction with the accompanying drawings of which:

FIG. 8 illustrates pseudocode of pseudo information retrieval for AR search engine according to one embodiment of the present disclosure.

DETAILED DESCRIPTION

Hereinafter, embodiments of the present disclosure are described with reference to the accompanying drawings.

Embodiments of the present disclosure relate to a technology for approaching to information in augmented reality environment.

The embodiments disclosed in this specification may enhance relevancy scores in AR domain through an AR search engine that automatically organizes, understands, searches, and summarizes web documents, and users may organize and manage relevant AR documents in various AR concepts and efficiently discover more accurate results in terms of relevancy in AR field.

A semantic information retrieval device according to embodiments of the present disclosure may be implemented by at least one computer device, and a semantic information retrieval method according to embodiments of the present disclosure may be performed through at least one computer device included in the semantic information retrieval device. At this time, in the computer device, a computer program according to one embodiment of the present disclosure may be installed and executed, and the computer device may perform the semantic information retrieval method according to embodiments of the present disclosure under the control of the executed computer program. The above described computer program may be combined with the computer device and stored on a computer-readable recording medium to execute the semantic information retrieval method on the computer.

Figure 1:
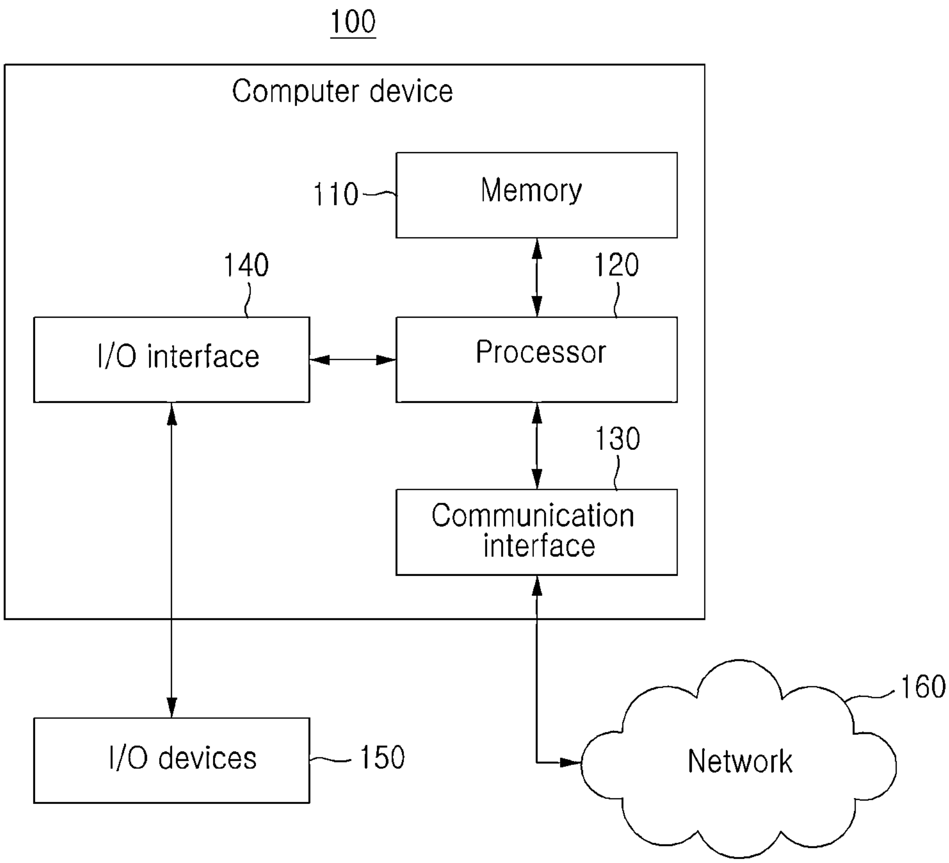
FIG. 1 is a block diagram for describing an example of internal configuration of a computer device according to one embodiment of the present disclosure.

FIG. 1 is a block diagram illustrating a computer device according to one embodiment of the present disclosure. For example, the semantic information retrieval device according to the embodiments of the present disclosure may be implemented by a computer device 100 shown in FIG. 1.

As shown in FIG. 1, the computer device 100 may include a memory 110, a processor 120, a communication interface 130, and an input/output (I/O) interface 140 as components for in executing the semantic information retrieval method according to the embodiments of the present disclosure.

The memory 110 is a computer-readable recording medium, and may include a permanent mass storage device, such as a random access memory (RAM), a read only memory (ROM) and a disk drive. Here, the permanent mass storage device, such as a ROM and a disk drive, may be included in the computer device 100 as a permanent storage device separated from the memory 110. Furthermore, an operating system and at least one program code may be stored in the memory 110. Such software components may be loaded from a computer-readable recording medium separated from the memory 110 to the memory 110. Such a separate computer-readable recording medium may include computer-readable recording media, such as a floppy drive, a disk, a tape, a DVD/CD-ROM drive, a memory card, and the like. In another embodiment, software components may be loaded onto the memory 110 through the communication interface 130, not a computer-readable recording medium. For example, the software components may be loaded onto the memory 110 of the computer device 100 based on a computer program installed by files received through a network 160.

The processor 120 may be configured to process instructions of a computer program by performing basic arithmetic, logic and I/O operations. The instructions may be provided to the processor 120 by the memory 110 or the communication interface 130. For example, the processor 120 may be configured to execute instructions received according to program code stored in a recording device, such as the memory 110.

The communication interface 130 may provide a function for enabling the computer device 100 to communicate with other devices through the network 160. For example, a request, an instruction, data or a file generated by the processor 120 of the computer device 100 according to program code stored in a recording device such as the memory 110 may be transmitted to other devices through the network 160 according to control of the communication interface 130. Inversely, a signal, an instruction, data or a file from another device may be received to the computer device 100 through the communication interface 130 of the computer device 100 passing through the network 160. A signal, an instruction or data and the like received through the communication interface 130 may be transmitted to the processor 120 or the memory 110, and a file may be stored in a storage medium (above described permanent storage device) which may be further included in the computer device 100.

A communication method is not limited, and may include short-distance wired/wireless communication between devices in addition to communication methods using communication networks (e.g., a mobile communication network, wired Internet, wireless Internet, a broadcasting network, and the like) which may be included in the network 160. For example, the network 160 may include one or more any networks of a personal area network (PAN), a local area network (LAN), a campus area network (CAN), a metropolitan area network (MAN), a wide area network (WAN), a broadband network (BBN), and the Internet. Furthermore, the network 160 may include any one or more of network topologies, including a bus network, a star network, a ring network, a mesh network, a star-bus network, and a tree or hierarchical network, but is not limited thereto.

The I/O interface 140 may be means for interface with an input/output (I/O) device 150. For example, the input device may include a device such as a microphone, a keyboard, a camera or a mouse and the like, and the output device may include a device such as a display or a speaker. For another example, the I/O interface 140 may be means for interface with a device in which functions for input and output have been integrated into one, such as a touch screen. The I/O device 150, together with the computer device 100, may be configured as a single device.

Furthermore, in other embodiments, the computer device 100 may include components less or more than the components of FIG. 1. However, it is not necessary to clearly illustrate most of conventional components. For example, the computer device 100 may be implemented to include at least some of the I/O device 150 above described or may further include other components such as a transceiver, a camera, various sensors, a database, etc.

Hereinafter, specific embodiments of the semantic information retrieval technology in an AR (Augmented Reality) domain will be described.

The present embodiment provides an AR search engine based on a semantic information retrieval method in AR domain to perform effective information retrieval from web documents. Through this, users may obtain more relevant results for search queries in different groups and obtain results very quickly in AR domain.

For this, the present disclosure provides an AR ontology for calculating relevance scores in semantic information retrieval by reviewing key AR concepts, such as software, hardware, tracking, interaction, and interface. In addition, the present disclosure provides semantic information retrieval based on the AR ontology and clustering method for conducting semantic analysis on web documents, retrieving syntactically and semantically relevant information from them, and clustering them according to the AR concepts. This is a query result clustering problem, which is conducted to enhance information retrieval accuracy.

The main content of the present disclosure is the AR ontology for clustering AR web documents into AR topics, and the ontology-based clustering method for an information retrieval system, and main advantages are fast retrieval times and semantic retrieval with hierarchical inheritance of ontology.

First, the AR ontology to be used in semantic information retrieval in AR domain, and superclasses, subclasses, and relationships according to AR concepts will be described.

AR Ontology

The AR ontology is built in four steps of specification, knowledge acquisition/conceptualization, implementation, and evaluation.

(1) AR Ontology Specification

Ontology specification is the first step of the ontology development procedure, and determines scope and purpose, intended users, and requirements of the ontology. The purpose of AR ontology is to offer an organized representation of augmented reality concepts to support semantic information retrieval from web documents, which is a shared reusable representation of the AR conceptualization. The scope of AR ontology involves the representation of AR and entities related to AR development for various applications according to the AR definition and characteristics. The end users of AR ontologies are developers, researchers, stakeholders, and relevant authorities. The developers may directly use AR ontology to develop various applications, including search engines and AR information retrieval. Other end users may indirectly use the ontology through software and applications that are developed based on it.

AR involves a ubiquitous user interface with three characteristics aimed at visualizing digital/virtual information that is directly registered in the real world. An AR system must combine real and virtual world, including interactions in real-time, and is registered in 3D. The AR definition requires specific hardware/devices, spatial registrations, and interactivities. The virtual information must align dynamically the tracking system by dynamically determining its spatial properties. The intuitive interactions between the user and virtual information are created through an appropriate user. Finally, it is the software that will make the hardware perform what AR systems need to do, regardless of the hardware platform.

(2) Knowledge Acquisition and Conceptualization

Figure 2:
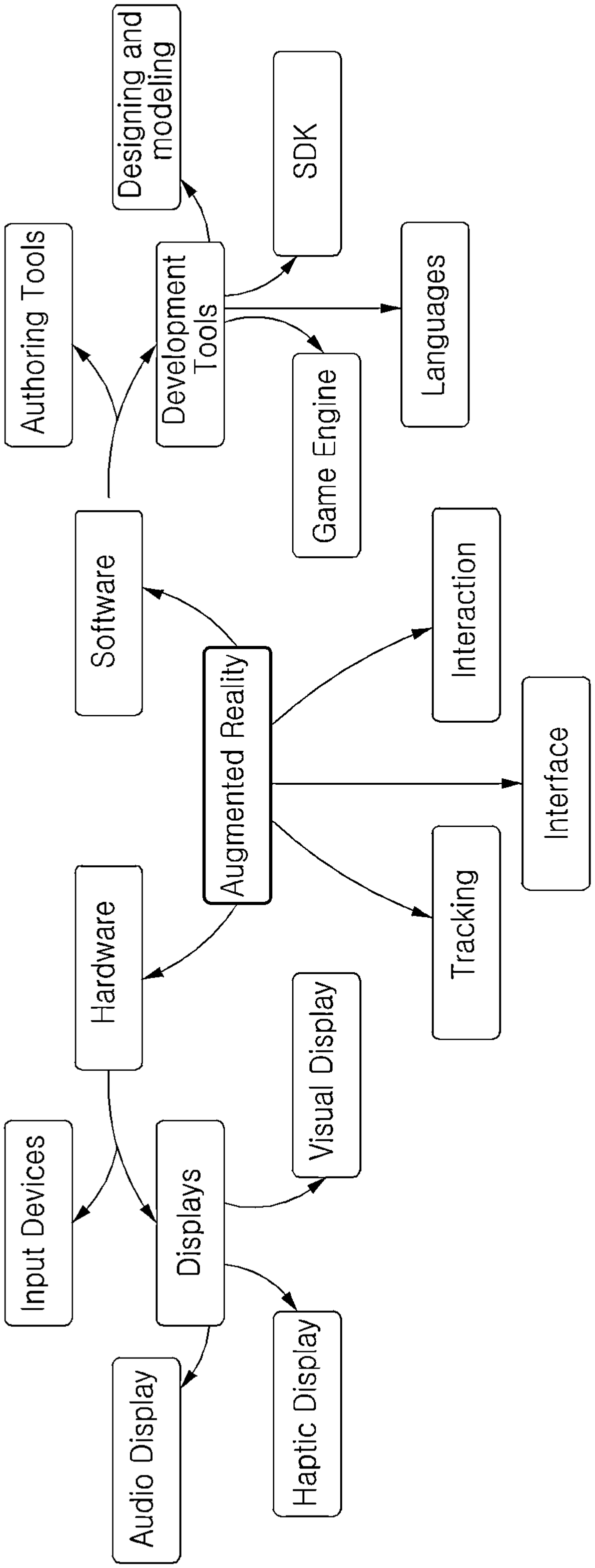
FIG. 2 illustrates main classes of AR ontology according to one embodiment of the present disclosure.

This step involves reviewing relevant knowledge regarding AR technology concepts as they are retrieved through search engines for AR system development in various applications. Relevant knowledge of AR ontology is obtained from existing ontologies and existing studies. Existing ontologies have not covered all AR concepts, and they are mostly developed for specific applications. Therefore, studies that have focused on AR concepts were used to develop AR ontologies. After collecting knowledge from the existing ontologies and relevant studies, the relevant terms were listed to define class hierarchies, class properties, and individuals. According to the AR definition, five superclasses-hardware, software, interaction, tracking, and interface—are defined. The relevant classes are defined as the subclasses for the superclasses with 'SubClass Of' property. FIG. 2 illustrates main classes of AR ontology based on the above concepts.

(3) AR Ontology Implementation

The AR ontology may be implemented in the Protégé software in the OWL format, and the OWL file may be utilized in the semantic information retrieval process to develop the AR search engine. The OWL, which includes classes, object properties, and data properties, is used to cluster web AR documents.

(4) AR Ontology Evaluation

There are several approaches for ontology evaluation. Task-based or application-based evaluation approaches are applied to evaluate the AR ontology. This approach evaluates the ontology's performance within the context of the application by measuring its competency to complete targeted tasks. The AR ontology is evaluated in the semantic information retrieval system.

Ontology Classes and Individuals

The software is related to creating and using an augmented reality system that might be used directly in the AR application, creating the AR application, or providing content for the AR application.

Figure 3:
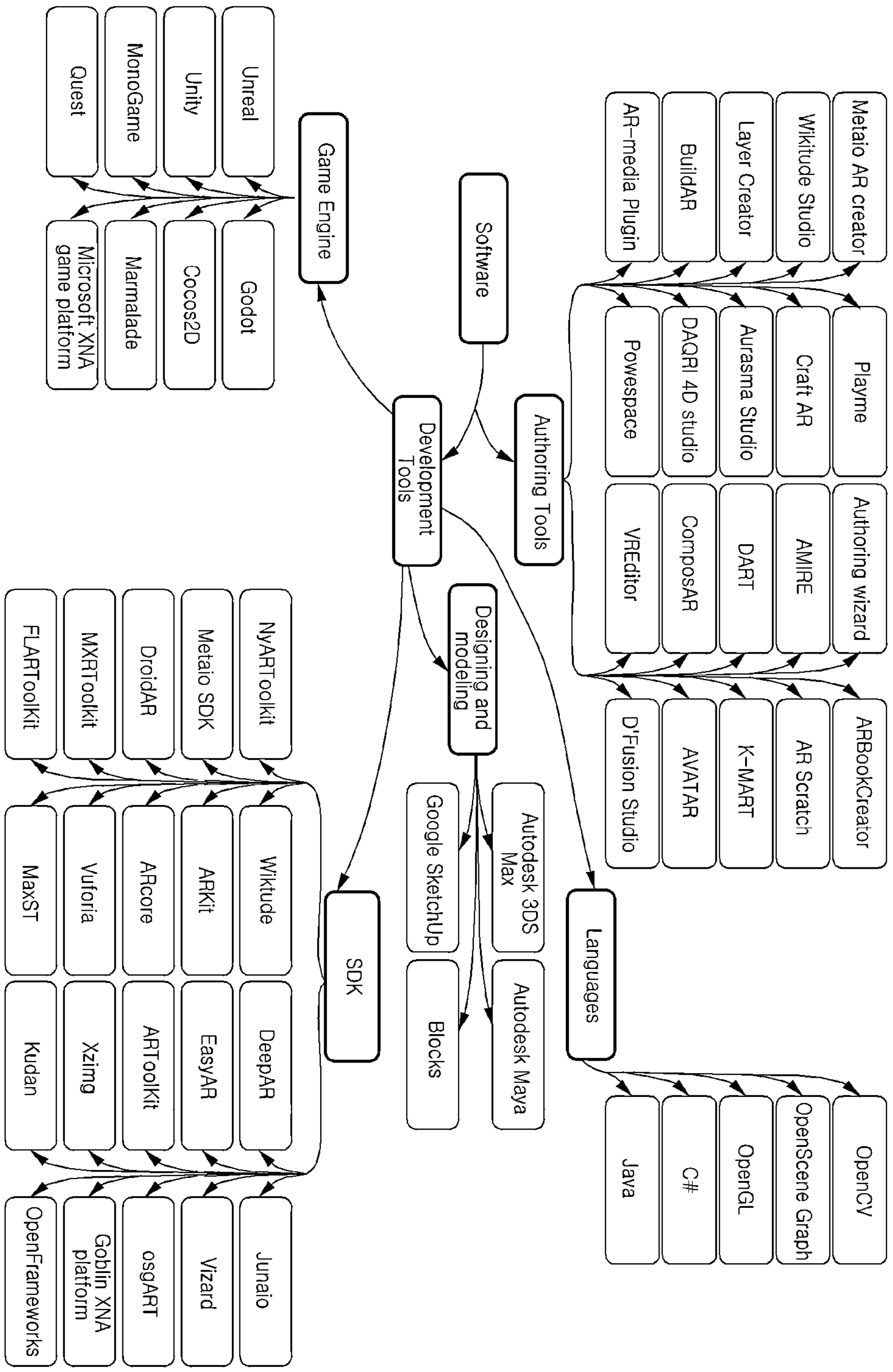
FIG. 3 illustrates AR software subclasses according to one embodiment of the present disclosure.

As shown in FIG. 3, the software may be divided into two main classes of authoring tools and developing tools. Authoring tools enable users with non-programming backgrounds to create virtual content in AR. There are a number of various types of AR authoring tools that can be used to create augmented reality experiences, and one tool is the DART (Designers AR Toolkit). Development tools contain SDK (Software Development Kits), game engines, design/modeling software, languages, and libraries. The AR SDK is a set of development tools that provides a variety of functionalities, including AR recognition, AR tracking, and AR content rendering. The SDK reduces the integration and development time for software professionals. Vuforia, Wikitude, ARCore, and ARToolkit are samples of AR SDKs that are widely used to develop AR applications. Vuforia engine's recognition and tracking features can support different types of targets, both 2D and 3D. The Vuforia SDK supports both Android and iOS platforms. Horizontal surfaces, such as floors and tabletops, can also be detected and tracked. The game engine, by providing an integrate AR framework, can interact with AR sensors and displays. The information that will be sent to the renderer in order to generate the signals for the display device is generated by the game engine, such as the unity development tool. The key feature of the game engine is to provide a simulation loop supporting user interaction.

Figure 4:
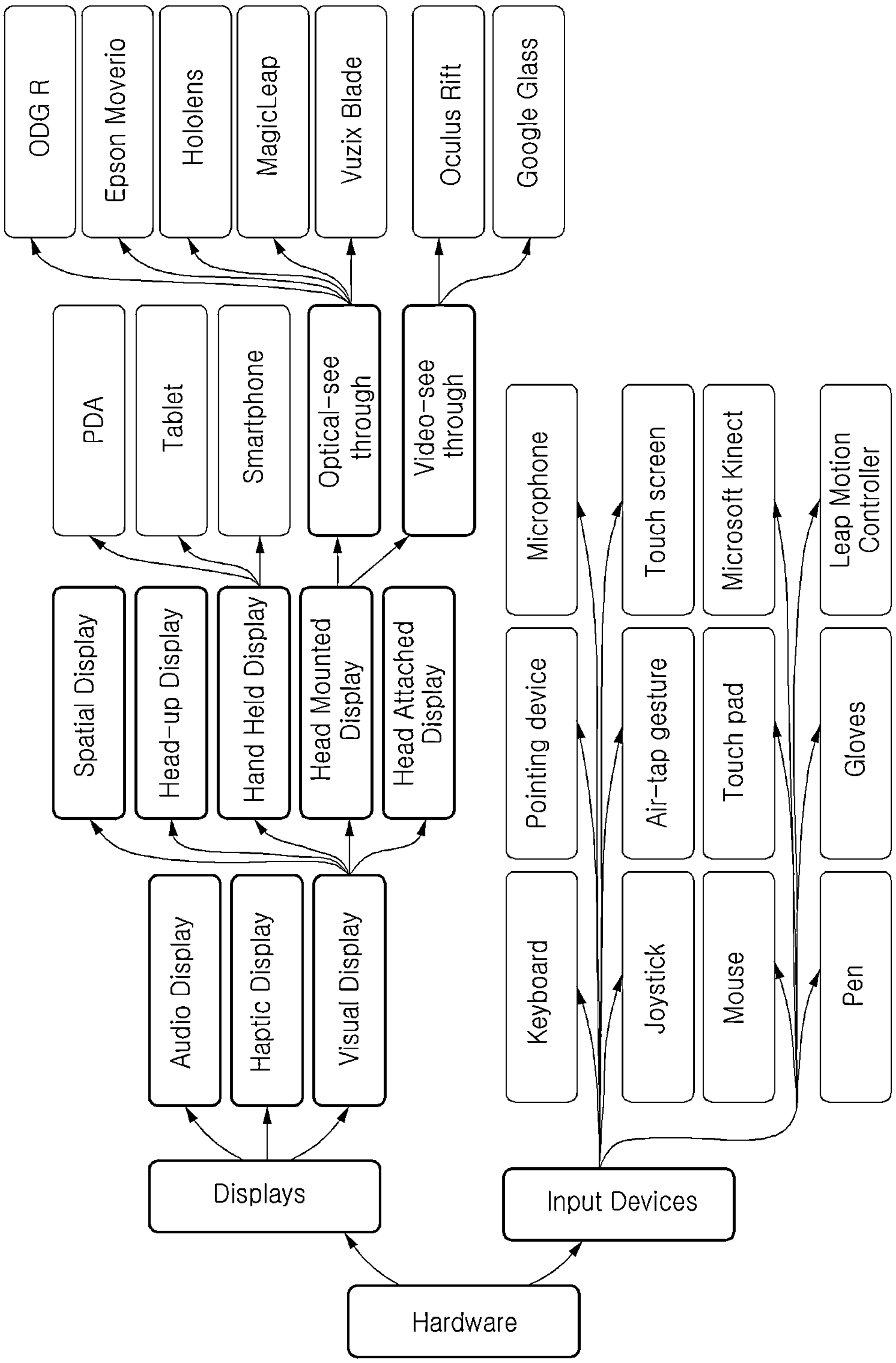
FIG. 4 illustrates AR hardware subclasses according to one embodiment of the present disclosure.

FIG. 4 illustrates AR hardware classes and their individuals. The main AR devices are displays and input devices. Displays deliver signals to senses of sight, touch, hearing, and smell, as well as taste in some cases. Therefore, visual and non-visual displays are both involved in the display class. Non-visual displays include audio, haptic, olfactory, and gustatory displays. The basic function of a visual display is to generate light signals that eyes interpret as visual imagery. In AR, there are four types of visual displays: HMD (head-mounted display)/HAD (head-attached display), HUD (head-up display (HUD), handheld display, and spatial display. In addition to displays, input devices help to realize an immersed environment, which enables the user to interact with virtual content, including selecting, manipulating, and creating virtual content. The Vive controller, gloves, pointing device, joystick, and touchpad are samples of the input devices.

An HMD that overlays both real and virtual images in the user's view of the world uses a device on the head or as part of a helmet. Merging real and virtual images can be accomplished by using either a video see-through or an optical see-through HMD system. The video see-through HMDs require two cameras and the processing of both cameras to provide both the "real part" of the augmented scene and the virtual objects with the unmatched resolution, while optical-see-through HMDs employ a half-silver mirror technology to allow views of the real world to pass through the lens and graphically overlay information to be reflected in the user's eyes. HUD is a method of projecting information onto windscreens, which is widely used in vehicles. The HUD provides transparent screens that visualize information without requiring drivers to take their eyes away from the road. This kind of display incorporates external environment information into the windshield screen by allowing drivers to focus their attention in a new way. Handheld devices, such as smartphones, tablets, and PDAs, are small computing devices that are equipped with panels of some sort to display on mobile projectors. They support mobile AR applications as they have enough computational capability and their projectors are small and portable enough. Finally, spatial displays enable users to experience AR without the need to wear or carry a display by augmenting digital information onto physical objects. This type of display supports the grouping of the users and collaboration between the users.

The tracking class, which is one of the most significant classes of AR systems, contains systems that execute virtual object registration in a real environment. The tracking systems are aimed at precisely aligning virtual information with the real world in real time in order to provide an engaging AR experience. As a result, the tracking system is utilized to dynamically identify the spatial attributes (6DOF) of virtual entitles (three components for the position and three components for the orientation) in the real world.

Figure 5:
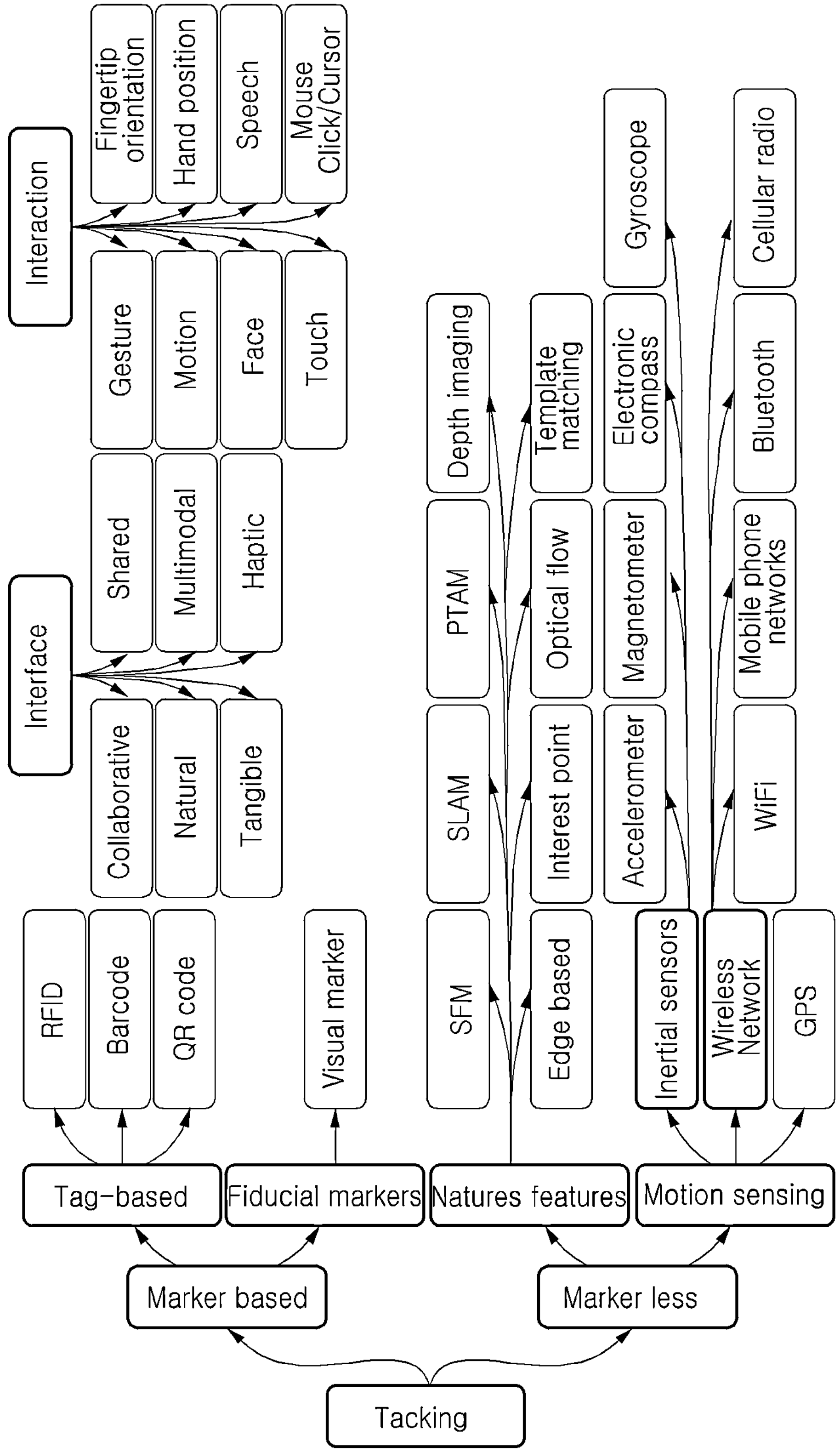
FIG. 5 illustrates AR tracking, interface, and interaction subclasses according to one embodiment of the present disclosure.

There have been a variety of methods for AR tracking, which are categorized into marker-based methods and marker-less methods. Referring to FIG. 5, Marker-based methods rely on physical markers, such as tags and fiducial markers, to identify objects in the real world. The markers should contain unique visual characteristics, such as lots of corners and edges, which could be easily detected with computer vision techniques. Marker-less methods have two subclasses. The former includes tracking methods that employ computer vision and image processing techniques to track the AR user based on natural features that are easily detectable in a scene. The latter are tracking methods that analyze the sensor data to estimate the camera's position and orientation.

Finally, AR interface and interactions are two main classes in AR systems. AR interfaces apply various techniques to create intuitive interactions between the user and the digital content. The AR interfaces depend on the number and variety of information inputs and outputs that enable users to interact with the AR systems. Tangible AR interfaces, collaborative AR interfaces, shared AR interfaces, haptic AR interfaces, natural interfaces, and multi-modal interfaces are samples of AR interfaces. The interaction methods include gesture recognition, facial recognition, speech recognition, touching, and pointing and grabbing.

Next, a methodology based on k-means clustering algorithm concept-based vector space model and TF-IDF (term frequency-inverse document frequency) approaches for AR search engine will be described.

The traditional web crawler results in the fields of AR have scarcely met efficiency and effectiveness performances, even when using an advanced document indexing approach because the amount of information available in AR fields is exponentially growing. For example, a user desires to find which AR SDKs are utilized in the field of agriculture, but the user searches with dissimilar keywords, such as "AR in Agriculture". Using the search keywords alone, the crawlers deliver irrelevant results, instead, the crawlers should categorize the results to highlight the results related to the AR SDKs that the user is interested in. Moreover, the user should search using several keywords to achieve the desired results, and categorizing the web crawler results into AR fields enables the user to obtain the desired result in an efficient way.

The main goal of the AR search engine according to the present disclosure is to effectively analyze the user query in the AR concepts with the least amount of effort and time. In order to integrate semantics into all-out web search tools, the existing tools may be enriched with the above described AR ontology.

Figure 6:
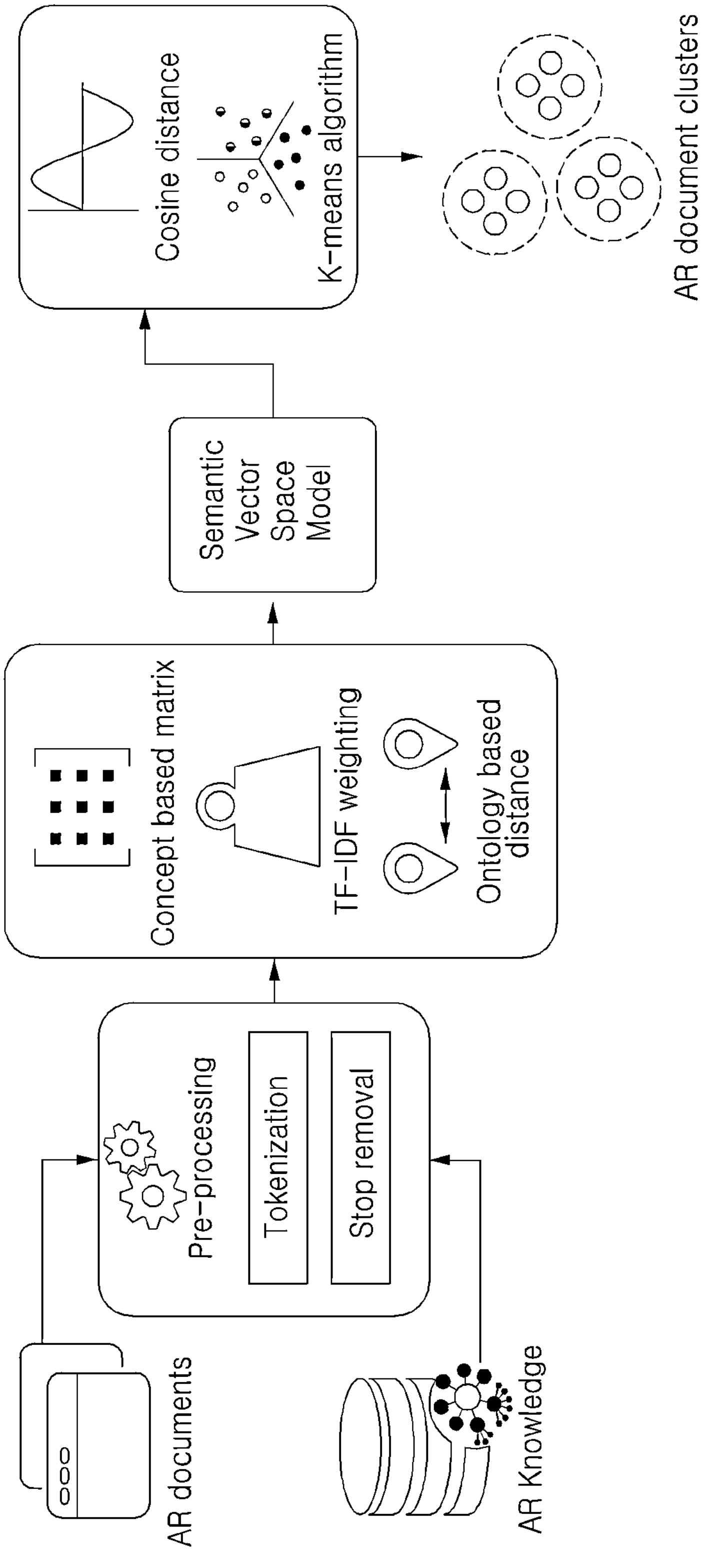
FIG. 6 illustrates a methodology for an ontology-based AR search engine according to one embodiment of the present disclosure.

FIG. 6 illustrates a methodology for an ontology-based AR search engine. The methodology according to the present disclosure consists of three steps of pre-processing, SVSM (Semantic Vector Space Modeling), and clustering. In the pre-processing step, the user query and web documents are analyzed to generate a clean and uniform format of data for the following processes. The SVSM step is represent AR documents as vectors according to the concepts of AR ontology. The clustering step is to be performed by semantically clustering all web documents into AR domains.

(1) Pre-Processing

The pre-processing step is necessary to obtain efficient results. The pre-processing step is conducted to convert query and AR documents into a sequence of words using NLP (Natural Language Processing) techniques including tokenization and stop-word removal. Tokenization is the process of breaking down an input query and AR documents into sentences and then individual words or terms. Stop-word lists are used to erase all non-informative terms.

(2) SVSM (Semantic Vector Space Modeling)

Figure 7:
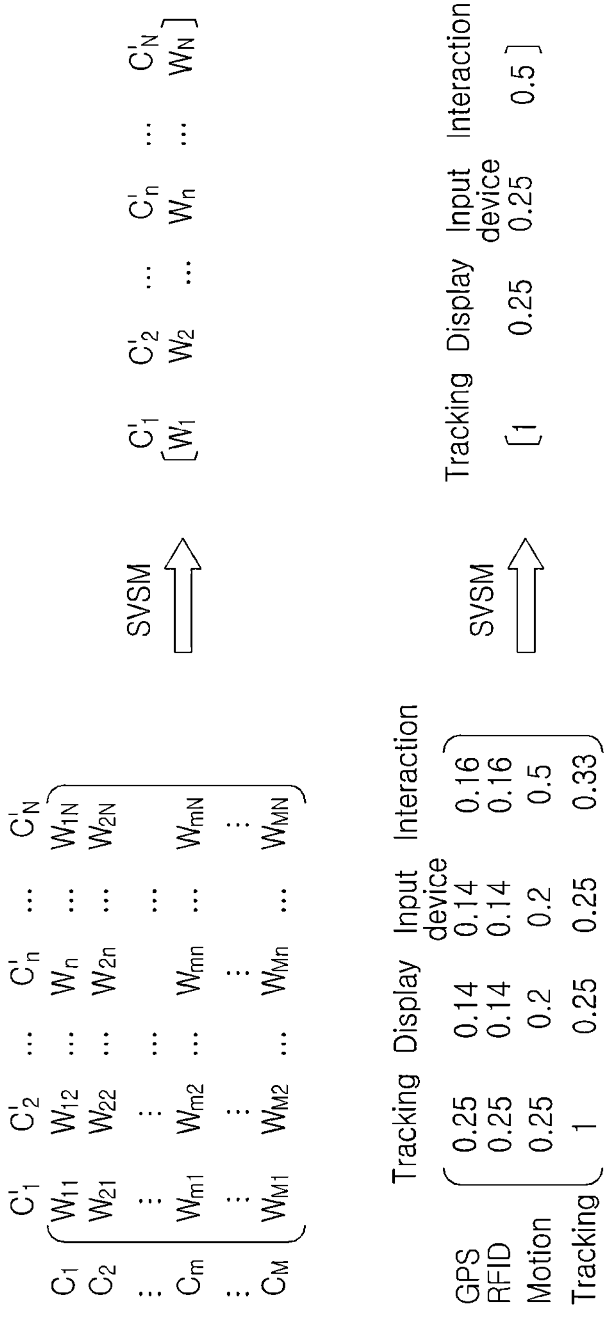
FIG. 7 is a drawing for describing SVSM (Semantic Vector Space Model) according to one embodiment of the present disclosure.

SVSM (Semantic Vector Space Modeling) is used in modeling step. An AR document $A_i$ is represented by an N-dimensional vector denoted by $A_i=\{w_n, n=1, \ldots, N\}$, where N is the number of main concepts in the AR ontology and $w_n$ is the weight of each concept. To create SVSM, it is considered that an ontology element, including a class or an individual, represents a concept in the AR domain. The main concepts are the superclasses that are used to represent each AR document and the clustering. The vector of each document is created in three steps. First, each document denoted by $D=\{A_i, i-1, \ldots, L\}$ creates a two-dimensional (MXN) matrix containing M concepts, where each element of the matrix represents the weight $w_{mn}$ corresponding to superclasses of seed concepts. Second, for each pair of the m and n concepts, $w_{mn}$ is calculated by using the semantic similarity between the concepts denoted by $s_{mn}$ and the TF-IDF score of the mth concept denoted by $t_m$. FIG. 7 illustrates the matrix and the SVSM with an example in the AR ontology domain. In FIG. 7, $$C_n'$$

was used to represent the main concepts.

$$w_{mn} = \frac{1}{2}(t_m + s_{mn}) \quad \text{[Equation 1]}$$

Semantic similarity $s_{mn}$ is determined as inversely proportional to the shortest distance $d_{mn}$ between concepts in the AR ontology, and according to the ontology hierarchy, the distance between two concepts is the number of links between the two concepts. For example, the distance between GPS and tracking is three, and the lower the similarity score, the further apart two concepts are in the AR ontology. Therefore, semantic similarity is mathematically defined as follows.

$$s_{mn} = \frac{1}{d_{mn} + 1} \quad \text{[Equation 2]}$$

The TF-IDF score, $t_m$, represents the importance of the concepts in each AR document $A_i$. In the present embodiment, the TF-IDF technique, which examines the relationship between each concept in a collection of documents, is used to give the concept weight. The technique extracts the keywords from the collection of documents in several steps, including computing similarities among documents, determining the search ranks. The TF reflects the importance of a concept in a document by measuring the occurrence of the concept, and a high value of TF means the high importance of the concept in the document. The importance of a concept in a collection of documents is measured by IDF, which is the inverse of how many times the concept appears.

$$t_{m,A_i} = TF(C_m, A_i) \cdot IDF(C_m) \quad \text{[Equation 3]}$$

$$TF(C_m, A_i) = \frac{f_{m,A_i}}{L} \quad \text{[Equation 4]}$$

$$IDF(C_m) = \log\frac{L}{|A_i \in D; C_m \in A_i|} \quad \text{[Equation 5]}$$

where, $f_{m,A_i}$ represents the number of times the concept $C_m$ appears in the AR document $A_i$ and $|A_i \in D{:}C_m \in A_i|$ represents the number of AR documents in which the concept $C_m$ appears. After creating the matrix in the second step, SVSM for each AR document may be completed by taking the maximum weight for a given superclass in the third step.

$$w_n = \underset{m}{\operatorname{argmax}}\left(w_{mn}\right) \quad \text{[Equation 6]}$$

(3) Clustering

Clustering, in which similar terms extracted from the documents are grouped to create clusters, is a kind of text-mining process. In this step, k-means clustering is used to cluster AR document vectors to display information retrieval results in clusters. The k-means algorithm is one of the most widely used unsupervised learning algorithms with the following objective function that should be minimized during the iterative process through necessary conditions.

$$J(z, B) = \sum_{i=1}^{L}\sum_{k=1}^{K} z_{ik}\|A_i - b_k\|^2 \quad \text{[Equation 7]}$$

where J(z,B) is the objective function, $B=\{b_k\}$ is the K cluster centers, and $z_{ik} \in 0,1$ is a binary value, which is 1 if $A_i$ belongs to k-th cluster. In the classical K-means algorithm, $\|A_i - b_k\|^2$ is the Euclidean distance between the AR document $A_i$ and the cluster center $b_k$. In applying the k-means algorithm for the clustering AR document, cosine distance, which provides better results when fining text similarities, is used. By assuming two documents in D ($A_p \in D$ and $A_q \in D$, in which p and q are the indexes of the documents), the cosine distance between two AR documents is calculated using the following equation.

$$w_n^p \text{ and } w_n^q$$

are the weight that are obtained for the main concept $$C_n'$$

for the $A_p$ and $A_q$ documents, respectively.

$$d_{pq} = 1 - \text{similarity}(A_p, A_q) \quad \text{[Equation 8]}$$

$$\text{similarity}(A_p, A_q) = \frac{\sum_{n=1}^{N} w_n^p \times w_n^q}{\sqrt{\sum_{n=1}^{N} (w_n^p)^2} \times \sqrt{\sum_{n=1}^{N} (w_n^q)^2}} \quad \text{[Equation 9]}$$

The present embodiments enable faster retrieval times and semantic retrieval with the hierarchical inheritance of ontology. In other words, the AR search engine may improve the performance of searching in the AR domains with the least amount of effort and time because it provides a simpler and more efficient tool to obtain the essential information for any users with minimal search keywords.

To evaluate the AR search engine which is AR search in the AR domains, two evaluation metrics of task completion time and MRR (mean reciprocal rank) may be used. The task completion time measures the efficiency of the engine, which means the total time that participants require to find the desired results in searching. The MRR measures the mean of the multiplicative inverse of the correct result's rank in the search engine's output sorted list of results. The MRR means how many results the participants check until they obtain the desired result, and it can be calculated with Equation 10.

$$MRR = \frac{1}{|Q|}\sum_{q=1}^{|Q|}\frac{1}{\text{rank}_q} \quad \text{[Equation 10]}$$

where, IQI is the number of searches, q is the index of the search, and $rank_q$ represents the rank position of the first correct result for the $q^{th}$ search.

FIG. 8 illustrates pseudocode of pseudo information retrieval method for AR search engine.

Likewise, the embodiments of the present disclosure may provide the semantic information retrieval based on the AR ontology for calculating relevance scores in semantic information retrieval by reviewing key AR concepts, such as software, hardware, tracking, interaction, and interface, and may provide the clustering method for conducting semantic analysis on web documents for semantic information retrieval, retrieving syntactically and semantically relevant information from them, and clustering them according to the AR concepts. Through the AR engine according to the present disclosure, users may organize and manage relevant AR documents in various AR concepts, and efficiently discover more accurate results in terms of relevancy in the AR field.

The device described herein may be implemented using hardware components, software components, and/or a combination thereof. For example, the device and components described in the embodiments may be implemented using one or more general-purpose or special purpose computers, such as, for example, a processor, a controller, an ALU (arithmetic logic unit), a digital signal processor, a microcomputer, a FPGA (field programmable gate array), a PLU (programmable logic unit), a microprocessor or any other device capable of responding to and executing instructions. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device in order to provide instructions or data to the processing device or be interpreted by the processing device. The software also may be distributed over network coupled computer systems so that the software is stored and executed in a distributed fashion. The software and data may be stored by one or more computer readable recording mediums.

The method according to the embodiments may be implemented in the form of a program instruction executable by various computer means and stored in a computer-readable storage medium. The medium may continue to store a program executable by a computer or may temporarily store the program for execution or download. Furthermore, the medium may be various recording means or storage means of a form in which one or a plurality of pieces of hardware has been combined, and the medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A semantic information retrieval method of a computer device comprising at least one processor, comprising:
- performing semantic information retrieval in an AR (Augmented Reality) domain by using AR ontology consisting of AR concepts, by the at least one processor,
- wherein the performing comprises:
- representing AR documents as vectors according to concepts of the AR ontology; and
- clustering AR document vectors into the AR domain.

2. The semantic information retrieval method of claim 1, wherein the AR ontology comprises hardware, software, tracking, interaction, and interface related to AR.

3. The semantic information retrieval method of claim 1, wherein the performing comprises categorizing web crawler results corresponding to search queries into AR fields through the AR ontology.

4. The semantic information retrieval method of claim 1, wherein the representing represents the AR documents as N-dimensional vectors by using SVSM (Semantic Vector Space Model).

5. The semantic information retrieval method of claim 1, wherein the representing, as representing the AR documents as N-dimensional vectors by using SVSM (Semantic Vector Space Model), comprises:
- creating a two-dimensional (MXN) matrix comprising M concepts for each document;
- weighting each concept based on TF-IDF (term frequency-inverse document frequency) score representing relationship between concepts corresponding to each pair of the two-dimensional matrix; and
- creating SVSM for corresponding document by applying maximum weight for superclasses of seed concepts.

6. The semantic information retrieval method of claim 1, wherein the clustering comprises displaying information retrieval results in clusters by clustering the AR document vectors by using k-means clustering.

7. The semantic information retrieval method of claim 1, wherein the performing further comprises pre-processing to convert query and AR documents into a word sequence before the representing.

8. The semantic information retrieval method of claim 7, wherein the pre-processing performs pre-processing through at least one of a process for performing tokenization breaking down query and AR documents into sentences and then individual words or terms, or a process for removing stopwords included in query and AR documents.

9. A non-transitory computer-readable recording medium storing program instructions configured to cause a computer device to perform operations comprising:

performing semantic information retrieval in an AR (Augmented Reality) domain by using AR ontology consisting of AR concepts, by at least one processor of the computer device, wherein the performing comprises:

representing AR documents as vectors according to concepts of the AR ontology; and clustering AR document vectors into the AR domain.

10. A computer device, comprising at least one processor implemented to execute instructions readable in a computer device, wherein the at least one processor performs semantic information retrieval in an AR (Augmented Reality) domain by using AR ontology consisting of AR concepts, wherein the at least one processor represents AR documents as vectors by using SVSM (Semantic Vector Space Model) according to concepts of the AR ontology, and clusters AR document vectors into the AR domain by using k-means clustering.

11. The computer device of claim 10, wherein the AR ontology comprises hardware, software, tracking, interaction, and interface related to AR.

* * * * *